United States Patent [19]

Semple et al.

[11] Patent Number: 5,495,664
[45] Date of Patent: Mar. 5, 1996

[54] APPARATUS FOR MAKING PERSONAL COMPUTER CARDS

[75] Inventors: Harry K. Semple, Fanwood; Carmine Bartiromo, West Orange, both of N.J.

[73] Assignee: A.K. Stamping Co. Inc., Mountainside, N.J.

[21] Appl. No.: 278,640

[22] Filed: Jul. 21, 1994

[51] Int. Cl.$^6$ ................................................. B23P 19/00
[52] U.S. Cl. ........................... 29/823; 29/509; 72/207; 53/378.3
[58] Field of Search ............... 72/207, 192; 29/823, 29/509; 53/376.3, 377.6, 378.3

[56] References Cited

U.S. PATENT DOCUMENTS

| | | | |
|---|---|---|---|
| 1,921,486 | 8/1933 | Seiferth | 72/207 |
| 2,027,293 | 1/1936 | Seiferth | 72/207 |
| 2,988,838 | 6/1961 | Morgan | 72/207 |
| 3,380,230 | 4/1968 | Carkhuff | 53/376.3 |
| 4,531,279 | 7/1985 | Gunter | 29/283.5 |
| 5,177,936 | 1/1993 | Myers et al. | 53/377.6 |
| 5,305,517 | 4/1994 | Schleicher | 29/283.5 |
| 5,315,743 | 5/1994 | Schleicher | 29/283.5 |

FOREIGN PATENT DOCUMENTS

| | | | |
|---|---|---|---|
| 0275368 | 1/1990 | Germany | 53/376.3 |
| 4-189706 | 7/1992 | Japan | 53/376.3 |

Primary Examiner—Irene Cuda
Assistant Examiner—Marc W. Butler
Attorney, Agent, or Firm—Samuelson & Jacob

[57] ABSTRACT

Apparatus for making personal computer cards nests side walls with side channels and end walls with end channels to close an enclosure of a personal computer card and then qualifies the dimensions of the closed enclosure by forming the nested walls and channels, preferably by impacting the nested walls and channels within forming dies, to attain the critical length, width and thickness prescribed for the personal computer card.

6 Claims, 9 Drawing Sheets

APPARATUS FOR MAKING PERSONAL COMPUTER CARDS

The present invention relates generally to personal computer cards and pertains, more specifically, to apparatus for making personal computer cards in which an electronic device is housed within an enclosure for convenient interconnection with a personal computer.

The increasing popularity of small portable computers, such as notebooks and hand-held computer systems, has given rise to the requirement for smaller, more compact devices, such as electronic memory devices, capable of use in connection with these computers. Personal computer cards, known as PC Cards, have been developed for adding memory, storage and input/output capabilities to such small portable computer systems. PC Cards are about the size and shape of a standard credit card and provide a wide variety of increased capabilities to host apparatus, such as laptops, notebooks, palmtops, tablets and other portable computing systems, equipped with a slot for receiving a PC Card.

The overall structure of a PC Card includes an enclosure within which there is housed an electronic device, which device usually includes electronic components mounted upon a circuit board, a power source, such as a battery, and connectors for enabling interconnection with a portable computing system, as well as for providing input/output capabilities. The enclosure usually is constructed of steel, preferably stainless steel, for strength and rigidity, so as to maintain the structural integrity and dimensional stability required in a PC Card, as well as for providing an effective electrically conductive shielding envelope for the electronic device housed within the enclosure.

In an earlier application, Ser. No. 08/106,210, filed Aug. 8, 1993, now U.S. Pat. No. 5,386,340, there is disclosed an enclosure for personal computer cards, and a method for making a so-enclosed personal computer card. The present invention provides apparatus and method for facilitating the completion of such a personal computer card and, as such, attains several objects and advantages, some of which are summarized as follows: Facilitates the rapid completion of a personal computer card of the type described with the accurate dimensions required for reliable use; promotes economy in the manufacture of personal computer cards through the use of relatively simple mechanical joining techniques, without requiring more intricate procedures such as welding or the addition of supplemental adhesives; provides a high degree of accuracy in the control of critical dimensions without the necessity for complex and expensive equipment and procedures; enables higher rates of production with increased ease and less expensive equipment; very quickly establishes all of the critical dimensions in a single operation for increased productivity at lesser expense; facilitates the handling of personal computer cards both during completion of the assembly of the cards and subsequent operations, such as supplemental mechanical procedures, testing, labelling and packaging; accommodates a variety of personal computer card configurations while providing enhanced strength, rigidity and electrical shielding integrity; facilitates high speed production for economical manufacture in large numbers of consistent high quality.

The above objects and advantages, as well as further objects and advantages, are attained by the present invention which may be described briefly as apparatus for making an accurately dimensioned personal computer card having a generally rectangular plan configuration including longitudinal sides and lateral ends, and a prescribed thickness along the longitudinal sides and lateral ends of the personal computer card from a blank having first and second shell-like members, each shell-like member having a generally rectangular plan configuration and including a panel, longitudinal side edges corresponding to longitudinal sides of the personal computer card, and lateral end edges corresponding to lateral ends of the personal computer card, channels integral with the panel of at least the second shell-like member and extending longitudinally along the longitudinal side edges of the second shell-like member, the channels having an external channel width extending altitudinally and corresponding to the prescribed thickness of the personal computer card along the longitudinal sides and lateral ends of the personal computer card, and an internal channel width, and side walls integral with the panel of at least the first shell-like member and extending longitudinally along the longitudinal side edge of the first shell-like member, the side walls having a side wall width extending altitudinally, the relative dimensions and locations of the internal channel width and the side wall width being such that upon juxtaposition of the first and second shell-like members in opposed arrangement, the panels confront one another and the side walls of the first shell-like member are nested within the corresponding channels of the second shell-like member to secure the first and second shell-like members together with the respective panels opposed to one another and spaced apart to establish an enclosure of prescribed dimensions for accommodating the electronic device between the opposed panels, the apparatus comprising: a frame; a loading station on the frame; a forming station on the frame downstream of the loading station along a longitudinal path of travel; a carrier for holding the blank with the shell-like members juxtaposed with one another; a track on the frame for guiding the carrier along the longitudinal path of travel from the loading station to the forming station; closing elements on the frame and juxtaposed with the track between the loading station and the forming station for nesting the side walls of the first shell-like member with the channels of the second shell-like member as the carrier is mowed from the loading station to the forming station; forming dies at the forming station and juxtaposed with the corresponding longitudinal side edges when the carrier is located at the forming station; and a press at the forming station for operating the forming dies to deform the nested side walls and channels when the carrier is located at the forming station to thereby qualify the prescribed dimensions of the enclosure and complete the accurately dimensioned personal computer card.

The invention will be understood more fully, while still further objects and advantages will become apparent, in the following detailed description of preferred embodiments of the invention illustrated in the accompanying drawing, in which.

Figure 1:
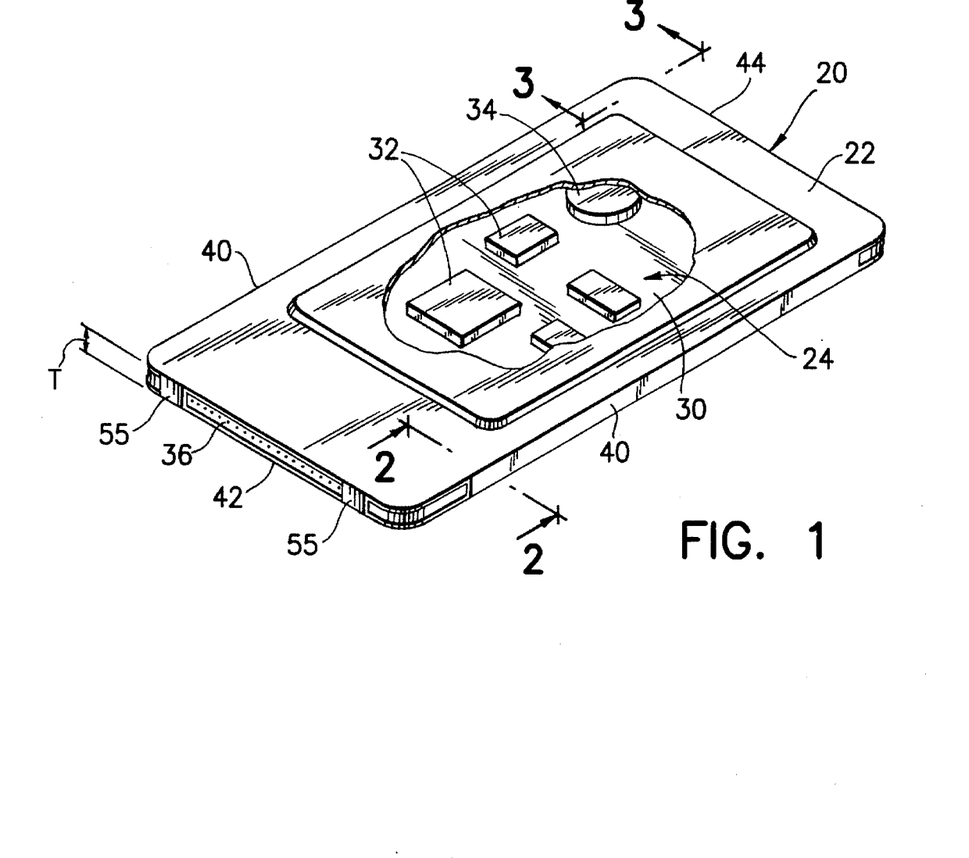
FIG. 1 is a perspective view of a personal computer card completed with the apparatus of the present invention, with portions cut away for illustrative purposes.

Referring now to the drawing, and especially to FIG. 1 thereof, a personal computer card is shown in the form of PC Card 20 constructed in accordance with the present invention and including an enclosure 22 housing an electronic device 24 having a circuit board 30 upon which is mounted a plurality of electronic components 32, in a manner now well known in the construction of electronic devices, a power source in the form of a battery 34, and a connector 36. Enclosure 22 houses the electronic device 24, including the circuit board 30, the battery 34 and the connector 36, and provides a relatively high strength, rigid housing for the PC Card 20, while at the same time serving as an electrically conductive shielding envelope necessary for the proper operation of the PC Card 20. PC Card 20 has a generally rectangular plan configuration with a periphery including longitudinal sides 40 of prescribed length and lateral ends 42 and 44 of given width, and has a predetermined thickness T along the longitudinal sides 40 and the lateral ends 42 and 44.

Figure 2:
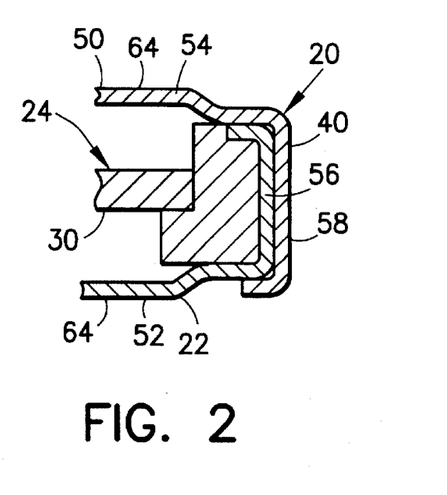
FIG. 2 is an enlarged fragmentary cross-sectional view taken along line 2—2 of FIG. 1.
Figure 3:
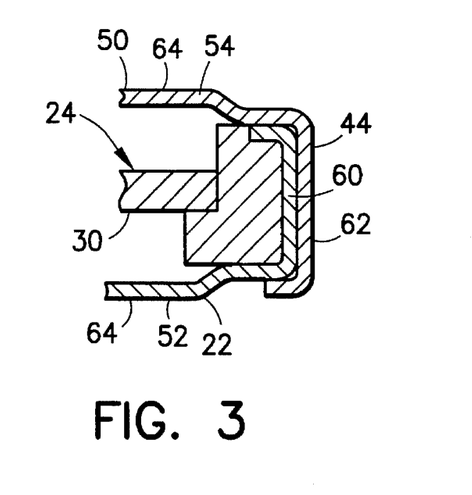
FIG. 3 is an enlarged fragmentary cross-sectional view taken along line 3—3 of FIG. 1.

As described in the aforesaid application, Ser. No. 08/106,210, filed Aug. 13, 1993, now U.S. Pat. No. 5,386,340 the disclosure of which is incorporated herein by reference thereto, and shown herein in FIGS. 2 and 3, enclosure 22 is constructed from a blank 50 stamped from a sheet of metal, preferably stainless steel, in a unitary, one-piece construction which includes first and second shell-like enclosure members 52 and 54, joined together by bridges 55, at lateral end 42. The longitudinal side edges of the enclosure members 52 and 54 are secured together along the sides 40 of the enclosure 22 by nesting a side wall 56 of the first shell-like enclosure member 52, shown in the form of a channel extending along the side edge of the first shell-like enclosure member 52, within a side channel 58 extending along the side edge of the second shell-like enclosure member 54, as seen in FIG. 2. In a similar manner, end walls 60 of the first shell-like enclosure member 52, shown in the form of channels extending along the end edge of the first shell-like enclosure member 52, are nested within respective end channels 62 extending along the corresponding end edge of the second shell-like enclosure member 54 to secure together the end edges of the first and second shell-like enclosure members 52 and 54 opposite the bridges 55. Each of the first and second shell-like enclosure members 52 and 54 include a panel 64. The present invention provides apparatus by which the side walls are nested within the side channels and the end walls are nested within the end channels to close the enclosure 22, and critical dimensions of the enclosure 22 are established accurately in the completed PC Card 20.

Figure 4:
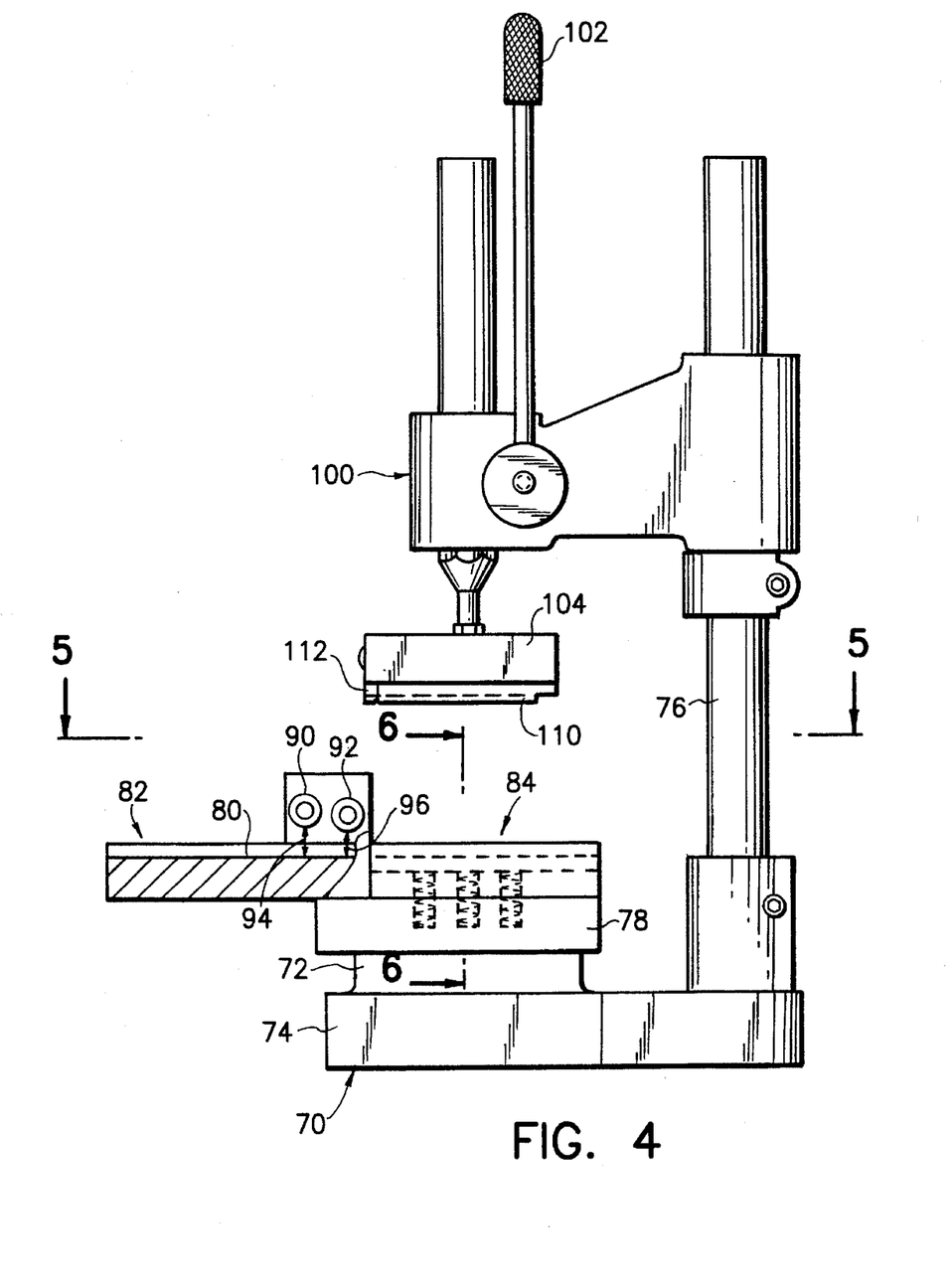
FIG. 4 is a side elevational view, partially cut away, of an apparatus constructed in accordance with the present invention.
Figure 5:
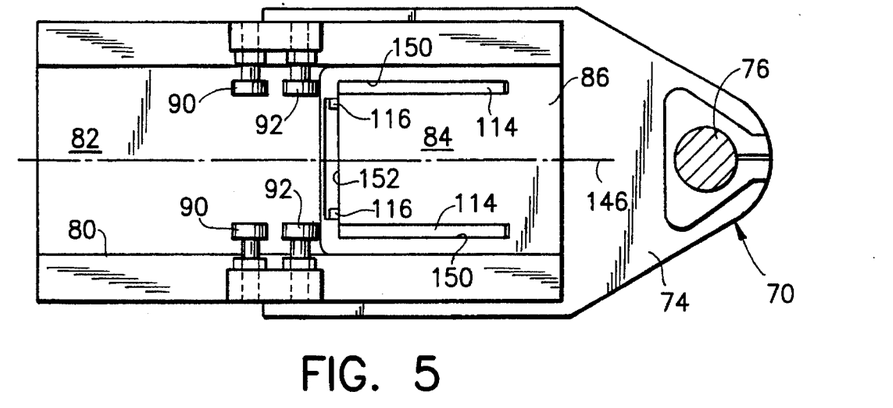
FIG. 5 is a top cross-sectional view taken along line 5—5 of FIG. 4.
Figure 6:
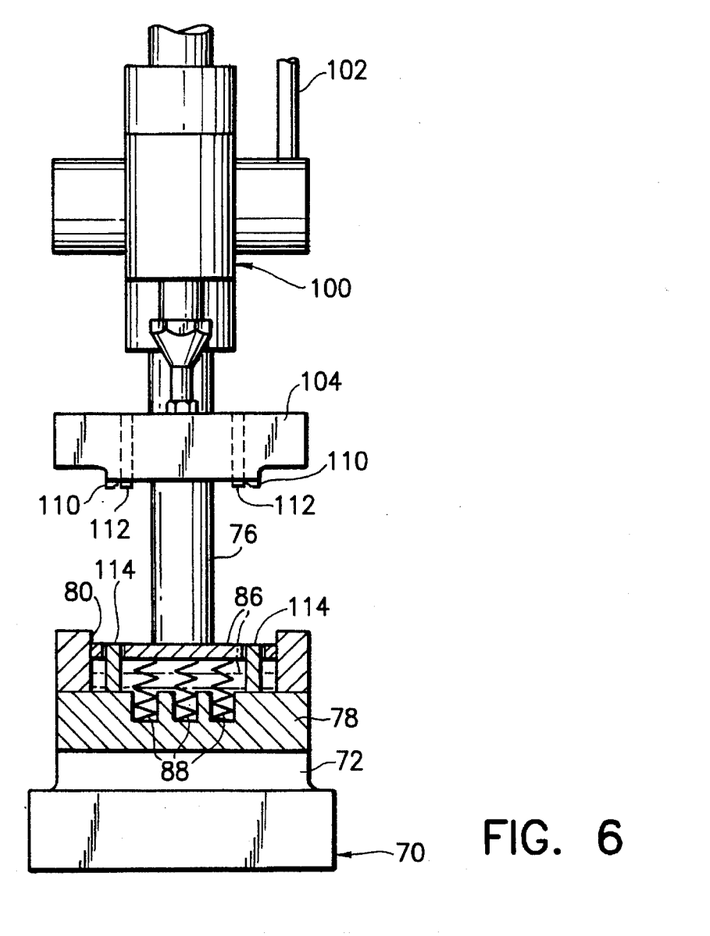
FIG. 6 is a front view, partially cross-sectioned along line 6—6 of FIG. 4.

Turning now to FIGS. 4, 5 and 6, an apparatus constructed in accordance with the present invention is shown at 70 and is seen to have a frame 72 which includes a base 74 and a post 76. A bed 78 is supported on the base 74 and includes a track 80 extending longitudinally from a loading station 82 to a forming station 84. A pad 86 is placed at the forming station 84 and is mounted on the frame 72 for altitudinal movement relative to the frame 72 between a reception position, as shown in full lines in FIG. 6, and a retracted position, illustrated in phantom in FIG. 6. Springs 88 bias the pad 86 into the reception position. Closing elements are mounted on the frame 72 intermediate the loading station 82 and the forming station 84 and are provided in the form of a pair of first rollers 90 journaled for rotation on the frame 72 and a pair of second rollers 92, also journaled for rotation on the frame 72, both pairs of rollers 90 and 92 being rotatable about a lateral axis. The first rollers 90 are spaced an altitudinal distance 94 from the track 80, while the second rollers 92 are spaced an altitudinal distance 96, with distance 94 being greater than distance 96 for purposes to be discussed in detail below.

A press 100 is located at the forming station 84 and is mounted on post 76 so as to be juxtaposed with the pad 86, altitudinally above the pad 86. Press 100 is manually operated and includes an actuating handle 102 which, when actuated, moves a platen 104 downwardly toward the pad 86. Platen 104 carries upper forming dies 110 and 112 which, upon downward movement of platen 104, are moved toward counterpart stationary lower forming dies 114 and 116, respectively, supported on bed 78.

Figure 7:
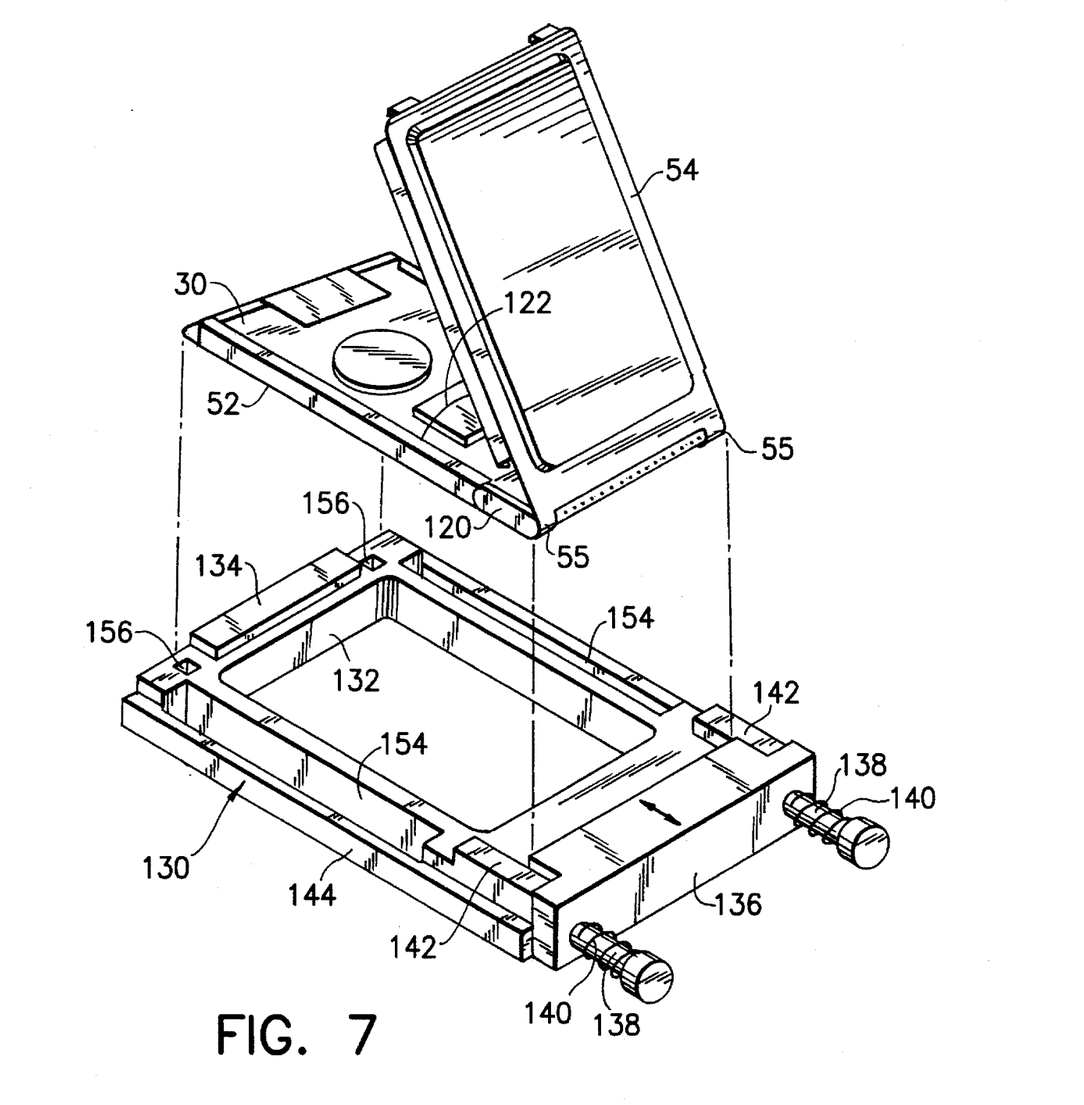
FIG. 7 is a perspective view of an early operation carried out by the apparatus of the present invention.

Referring now to FIG. 7, PC Card 20 is assembled by placing circuit board 30 in a support frame 120 and then inserting the support frame 120, with the circuit board 30, into the enclosure member 52, which now becomes a lower enclosure member. The upper enclosure member 54 then is partially folded, about the bridges 55, to form an acute angle 122 with the lower enclosure member 52, and the entire assembly is placed within a carrier 130. Carrier 130 includes a rectangular pallet 132 having a rear stop 134 and a forward clamping member 136 mounted on the pallet 132 for sliding movement in longitudinal directions relative to the pallet 132, along a pair of pins 138 affixed to the pallet 132. A pair of helical springs 140 bias the clamping member 136 rearwardly such that upon placement of the lower enclosure member 52 upon the pallet 132, the lower enclosure member 52 is clamped and precisely located between the rear stop 134 and the clamping member 136 for accurate location within the carrier 130. To this end, carrier 130 includes side locator bars 142 for accurate lateral positioning of the lower enclosure member 52 on the pallet 132.

Figure 8:
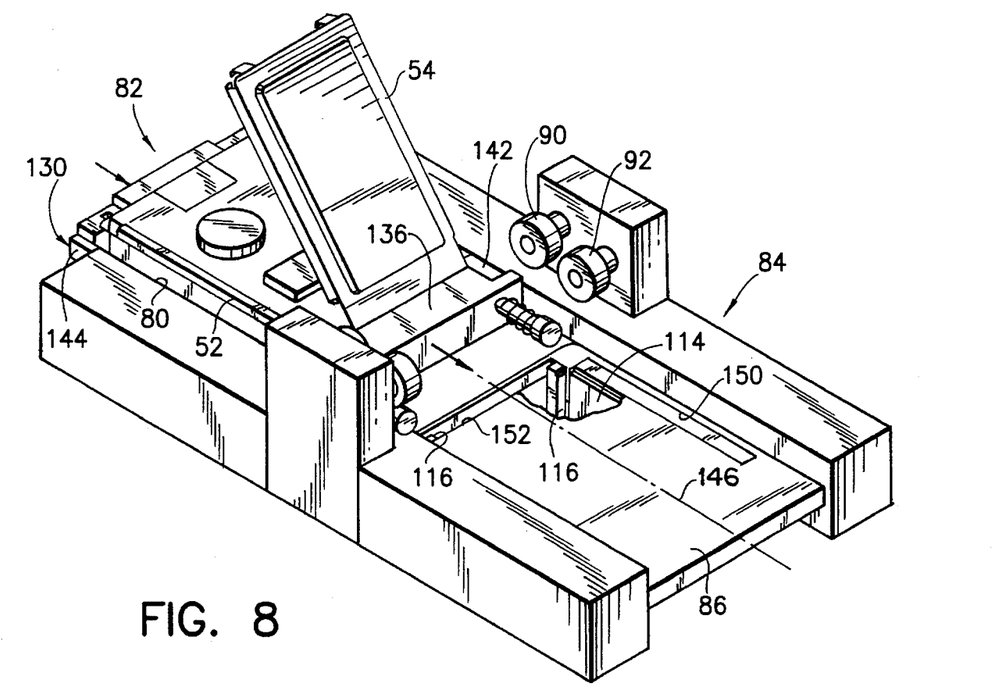
FIG. 8 is a perspective view of a subsequent operation.
Figure 9:
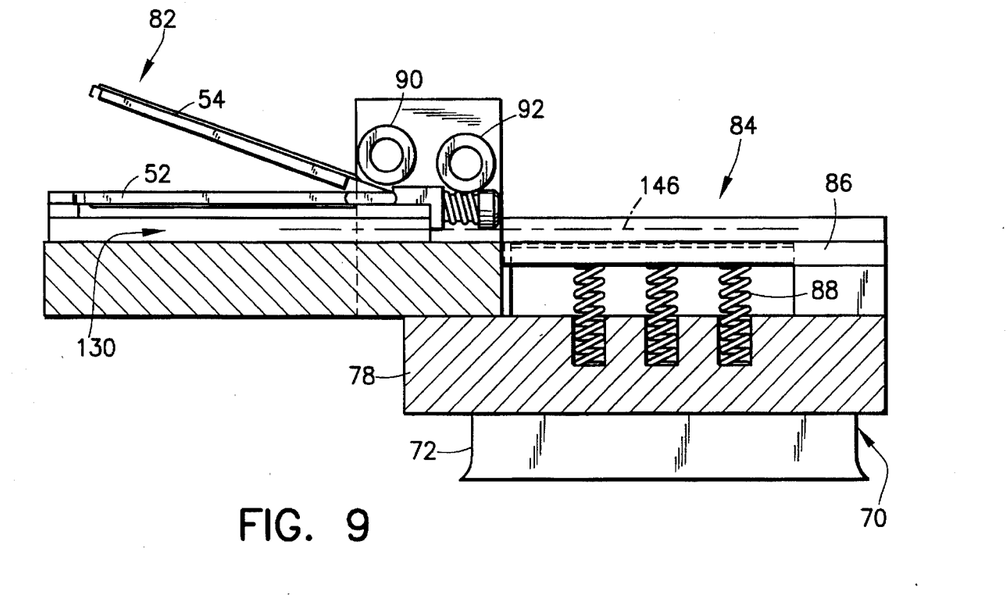
FIGS. 9 through 11 are diagrammatic, fragmentary longitudinal cross-sectional views showing operations of the apparatus of the invention.
Figure 10:
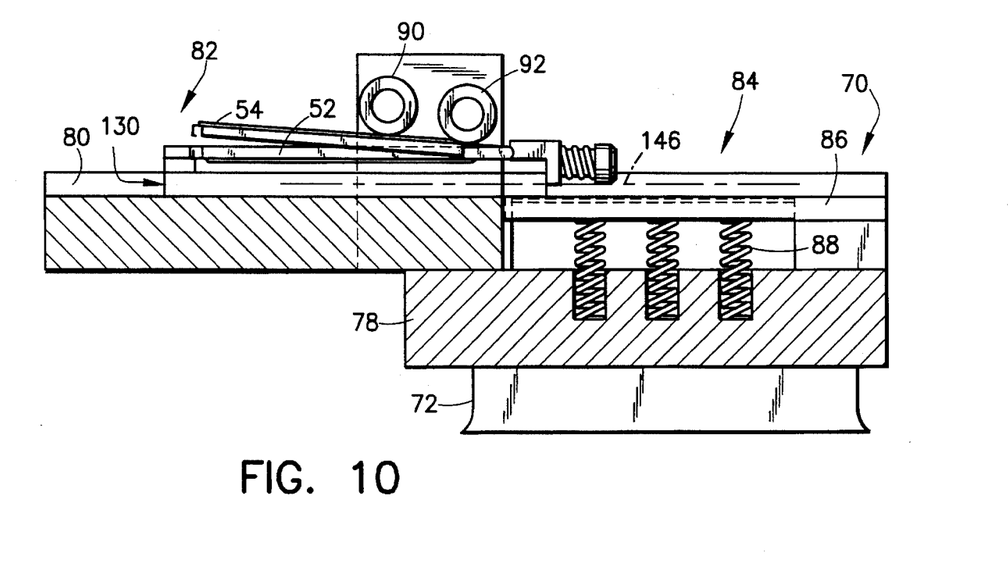
Figures 11, 12:
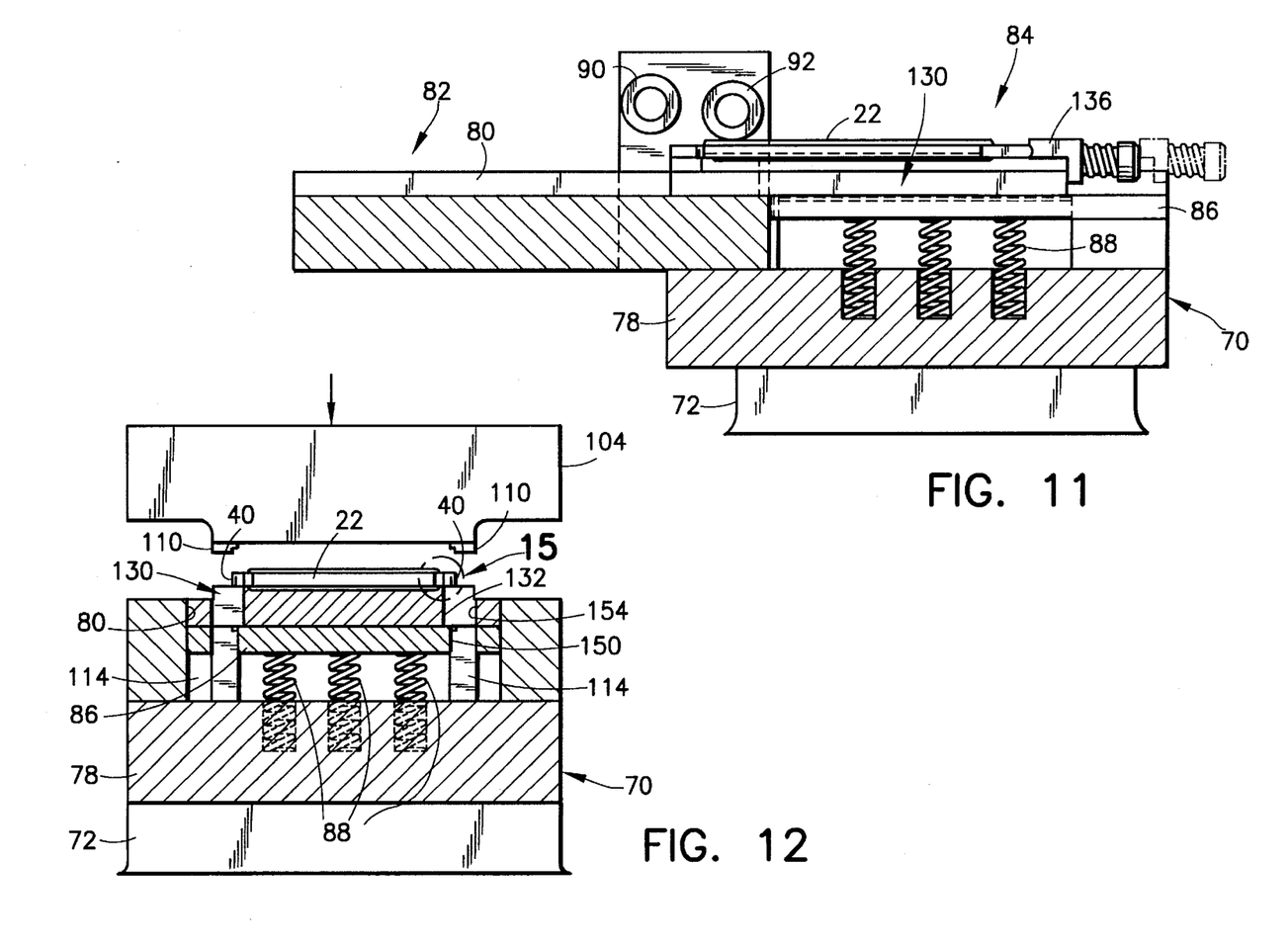
FIG. 12 is a diagrammatic, fragmentary lateral cross-sectional view just prior to a further operation.

Turning now to FIG. 8, carrier 130, with the lower enclosure member 52 clamped in place as set forth above, then is placed in the track 80, at the loading station 82, carrier 130 having a slide 144 which is complementary to track 80 and enables the carrier 130 to be translated along a longitudinal path of travel 146 from the loading station 82 toward the forming station 84 by manually pushing the carrier 130 along the path of travel 146, with the track 80 guiding the carrier 130 along the path of travel 146. As best seen in FIGS. 9, 10 and 11, as the carrier 130 is advanced along the path of travel 146, the partially folded enclosure members 52 and 54 pass beneath the first rollers 90, now seen to be leading rollers, which leading rollers 90 force the upper enclosure member 54 downwardly toward the lower enclosure member 52, thereby initiating engagement and nesting of the side walls 56 and the side channels 58 of the lower and upper enclosure members 52 and 54, as illustrated in FIG. 9. Continued forward movement of the carrier 130 brings the leading portions of the upper and lower enclosure members 54 and 52 beneath the second rollers 92, now seen to be trailing rollers 92, which trailing rollers 92 engage the upper enclosure member 54 to force the upper enclosure member 54 downwardly and complete the engagement and nesting of the side walls 56 and the side channels 58, as seen in FIG. 11, while the leading rollers 90 assist the transition, as illustrated in FIGS. 9 and 10, into the fully nested configuration, the progressive engagement of the side walls 56 with the side channels 58 resembling somewhat the engagement of a slide fastener. As the end walls 60 and the end channels 62 pass beneath the trailing rollers 92, the end walls 60 are nested within the end channels 62, in a like manner. When the carrier 130 reaches the fully advanced position shown in phantom in FIG. 11, the side walls 56 and the side channels are fully nested, the end walls 60 and the end channels 62 are fully nested, the enclosure 22 is closed and the overall dimensions of the PC Card 20 approach the critical desired length, width and thickness. The carrier 130, and the PC Card 20 therein, are located at the forming station 84 and the carrier 130 is registered with the pad 86.

Figure 13:
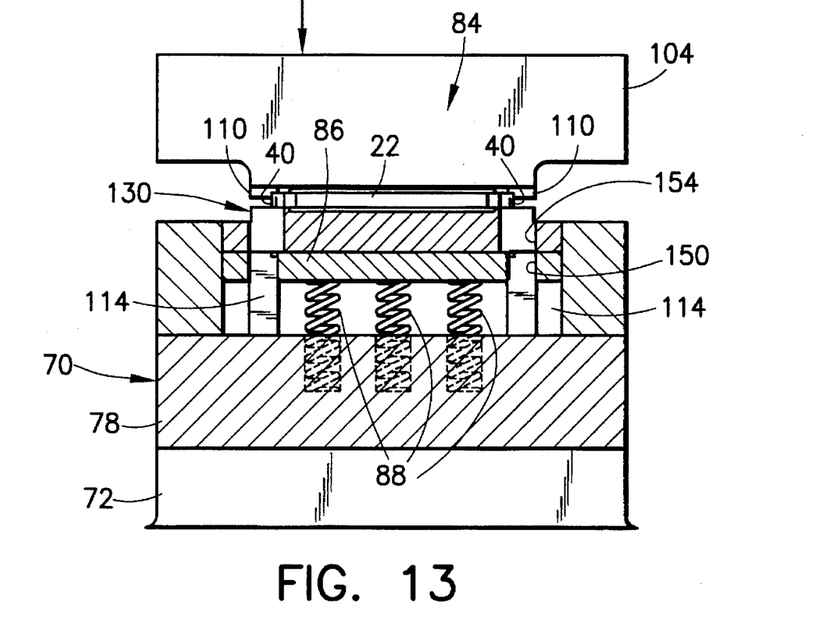
FIGS. 13 and 14 are diagrammatic, fragmentary lateral cross-sectional views showing the further operation.
Figure 14:
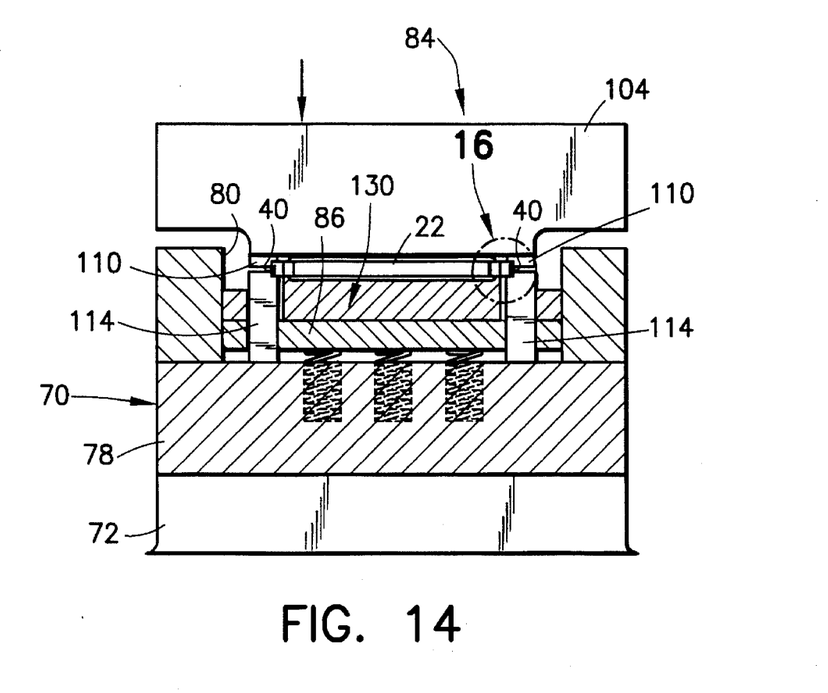
Figure 15:
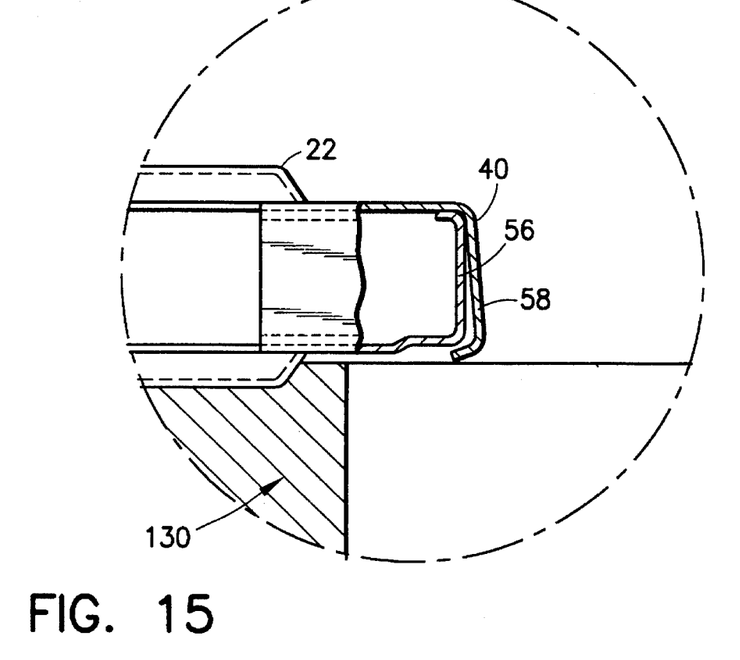
FIG. 15 is an enlarged fragmentary view of a circled portion of FIG. 12, exaggerated for illustrative purposes.
Figure 16:
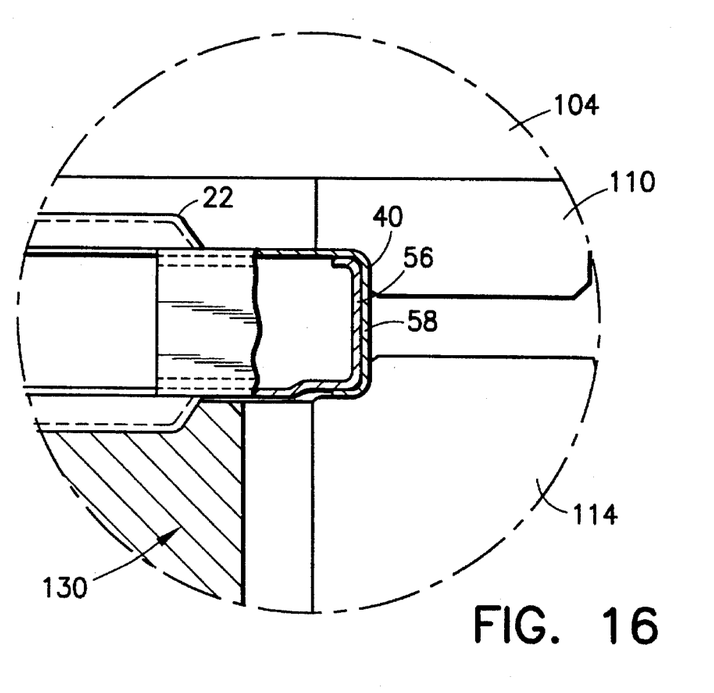
FIG. 16 is an enlarged fragmentary view of a circled portion of FIG. 14.

In order to assure that the length, width and thickness of the PC Card 20 are determined accurately, while completing the full nesting of the side walls 56 with the side channels 58 and the full nesting of the end walls 60 with the end channels 62, a forming operation is performed at the forming station. Thus, referring to FIGS. 12 through 16, as well as to FIG. 4, as the actuating handle 102 of the press 100 is rotated to move the platen 104 downwardly, the upper forming dies 110 are brought downwardly from the position shown in FIG. 12 to be placed against the sides 40 of the enclosure 22, as shown in FIG. 13. At the same time, the upper forming dies 112 are brought against the end 44 of the enclosure 22. Further downward movement of the platen 104 displaces the pad 86 from the reception position, shown in FIGS. 12 and 13, to the retracted position, illustrated in FIG. 14. The carrier 130, which is registered with the pad 86, follows the pad 86 downwardly, both the pad 86 and the pallet 132 of the carrier 130 having apertures 150, 152 and 154, 156 complementary to the respective lower forming dies 114 and 116 (see FIGS. 7 and 8) so as to permit such downward movement and engagement of the lower forming dies 114 and 116 with the respective sides 40 and end 44 of the enclosure 22. Sufficient force then is exerted by the press 100 to deform the nested side walls 56 and side channels 58 at the sides 40 of the enclosure 22 and the end walls 60 and end channels 62 at the end 44 of the enclosure 22, as illustrated in the transition from the configuration shown in FIG. 15 to the configuration shown in FIG. 16, thereby qualifying, or conforming, the length, width and thickness of the enclosure 22 to the critical dimensions prescribed for the completed PC Card 20.

Press 100 preferably is an impact press which is actuated to provide a selected impact upon the enclosure 22 at the forming dies 110, 112, 114 and 116. It has been found that; by impacting the nested walls and channels to accomplish deformation for the purpose of qualifying the dimensions of the enclosure 22, a high degree of accuracy is attained in the dimensions of the completed PC Card 20, with a simplified apparatus. A suitable impact press is available commercially and provides an economical alternative to other available forming presses.

Once the qualifying operation is complete, the carrier 130 may be removed from the bed 78 of the apparatus 70, and the completed PC Card 20 may be unclamped and delivered for use. Alternately, the PC Card 20 may be retained within the carrier 130 to facilitate handling and transport of the PC Card 20 for further operations, such as supplemental mechanical procedures, testing, labelling and packaging.

It will be seen that the present invention attains the several objects and advantages summarized above, namely: Facilitates the rapid completion of a personal computer card of the type described with the accurate dimensions required for reliable use; promotes economy in the manufacture of personal compute cards through the use of relatively simple mechanical joining techniques, without requiring more intricate procedures such as welding or the addition of supplemental adhesives; provides a high degree of accuracy in the control of critical dimensions without the necessity for complex and expensive equipment and procedures; enables higher rates of production with increased ease and less expensive equipment; very quickly establishes all of the critical dimensions in a single operation for increased productivity at lesser expense; facilitates the handling of personal computer cards both during completion of the assembly of the cards and subsequent operations, such as supplemental mechanical procedures, testing, labelling and packaging; accommodates a variety of personal computer card configurations while providing enhanced strength, rigidity and electrical shielding integrity; facilitates high speed production for economical manufacture in large numbers of consistent high quality.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. Apparatus for making an accurately dimensioned personal computer card having a generally rectangular plan configuration including longitudinal sides and lateral ends, and a prescribed thickness along the longitudinal sides and lateral ends of the personal computer card from a blank having first and second enclosure members, each enclosure member having a generally rectangular plan configuration and including a panel, longitudinal side edges corresponding to the longitudinal sides of the personal computer card, and lateral end edges corresponding to the lateral ends of the personal computer card, channels integral with the panel of at least the second enclosure member and extending longitudinally along the longitudinal side edges of the second enclosure member, the channels having an external channel width extending altitudinally and corresponding to the prescribed thickness of the personal computer card along the longitudinal sides and the lateral ends of the personal computer card, and an internal channel width, and side walls integral with the panel of at least the first enclosure member and extending longitudinally along the longitudinal side edges of the first enclosure member, the side walls having a side wall width extending altitudinally, the relative dimensions and locations of the internal channel width and the side wall width being such that upon juxtaposition of the first and second enclosure member in opposed arrangement, the panels confront one another and the side walls of the first enclosure member are nested within the channels of the second enclosure member to secure the first and second enclosure members together with the panels opposed to one another and spaced apart to establish an enclosure of prescribed dimensions for accommodating an electronic device between the opposed panels, the apparatus comprising:

a frame;

a loading station on the frame;

a forming station on the frame downstream of the loading station along a longitudinal path of travel;

a carrier for holding the blank with the enclosure members juxtaposed with one another;

a track on the frame for guiding the carrier along the longitudinal path of travel from the loading station to the forming station;

closing elements on the frame and juxtaposed with the track between the loading station and the forming station for nesting the side walls of the first enclosure member with the channels of the second enclosure member as the carrier is moved from the loading station to the forming station;

forming dies at the forming station and juxtaposed with the longitudinal side edges when the carrier is located at the forming station; and a press at the forming station for operating the forming dies to deform the nested side walls and channels when the carrier is located at the forming station to thereby qualify the prescribed dimensions of the enclosure and complete the accurately dimensioned personal computer card.

2. The apparatus of claim 1 wherein the first and second enclosure members include lateral end walls nested within lateral end channels, the apparatus including further forming dies at the forming station and juxtaposed with the end edges for operation by the press to deform and thereby qualify the nested lateral end walls and lateral end channels when the carrier is located at the forming station to complete the accurately dimensioned personal computer card.

3. The apparatus of claim 1 wherein the press is an impact press for exerting an impact on the forming dies to qualify the nested side walls and channels.

4. The apparatus of claim 1 wherein each of the closing elements includes at least one roller journaled for rotation on the frame in juxtaposition with each longitudinal side edge, the rollers being spaced altitudinally from the carrier a distance which enables the rollers to urge the side walls and channels into fully nested engagement.

5. The apparatus of claim 1 wherein the closing elements include first rollers and second rollers journaled for rotation on the frame in juxtaposition with each longitudinal side edge, the first and second rollers being spaced from one another along the longitudinal path of travel, and the second rollers being spaced altitudinally from the carrier a predetermined distance which enables the second rollers to urge the side walls and channels into fully nested engagement and the first rollers being spaced altitudinally from the carrier a distance greater than the predetermined distance to urge the side walls and channels toward nested engagement.

6. The apparatus of claim 1 including:

a pad mounted on the frame at the forming station for altitudinal movement between a reception position, wherein the carrier is received on the pad upon advancement of the carrier from the loading station to the forming station, and a retracted position, wherein the pad and the carrier are displaced altitudinally from the reception position;

the forming dies include fixed dies on the frame adjacent the pad, and movable dies coupled with the press for movement toward and away from the fixed dies;

at least one spring biasing the pad into the reception position; and the pad being movable from the reception position to the retracted position in response to engagement of the movable dies with the nested side walls and channels and movement of the movable dies toward the fixed dies.

\* \* \* \* \*